United States Patent [19]

Coetzer et al.

[11] Patent Number: 5,476,733
[45] Date of Patent: Dec. 19, 1995

[54] ELECTROCHEMICAL CELL

[75] Inventors: Johan Coetzer, Proviine; Isak L. Vlok, Transvaal Province, both of South Africa

[73] Assignee: Programme 3 Patent Holdings, Lys Royal, Luxembourg

[21] Appl. No.: 344,651

[22] Filed: Nov. 18, 1994

Related U.S. Application Data

[63] Continuation of Ser. No. 215,844, Mar. 22, 1994, abandoned.

[30] Foreign Application Priority Data

| Apr. 2, 1993 | [ZA] | South Africa | 93/2406 |
| Apr. 15, 1993 | [ZA] | South Africa | 93/2650 |
| May 18, 1993 | [ZA] | South Africa | 93/3459 |
| Dec. 6, 1993 | [ZA] | South Africa | 93/9121 |

[51] Int. Cl.⁶ .......................... H01M 4/58; H01M 10/39
[52] U.S. Cl. .......................... 429/103; 429/104; 429/112; 29/623.1
[58] Field of Search .................... 429/103, 104, 429/102, 101, 112, 50, 218, 224, 223, 220, 221; 29/623.1, 623.5

[56] References Cited

U.S. PATENT DOCUMENTS

| 3,847,667 | 11/1974 | Werth | 136/6 FS |
| 3,877,984 | 4/1975 | Werth | 136/6 F |
| 4,546,055 | 10/1985 | Coetzer et al. | 429/103 |
| 4,592,969 | 6/1986 | Coetzer et al. | 429/50 |
| 4,797,333 | 1/1989 | Coetzer et al. | 429/103 |
| 4,992,345 | 2/1991 | Meintjes et al. | 429/103 |
| 5,234,778 | 8/1993 | Wright | 429/103 |

FOREIGN PATENT DOCUMENTS

| 2159661 | 12/1985 | United Kingdom . |
| 2164786 | 3/1986 | United Kingdom . |
| 2191332 | 12/1987 | United Kingdom . |
| 2191333 | 12/1987 | United Kingdom . |
| 2226692 | 4/1990 | United Kingdom . |

*Primary Examiner*—Anthony Skapars
*Attorney, Agent, or Firm*—Arnold, White & Durkee

[57] ABSTRACT

A high temperature rechargeable electrochemical power storage cell has a molten sodium anode separated by sodium ion-conducting solid electrolyte separator from a solid cathode comprising an electronically conductive electrolyte-permeable porous matrix. The matrix is impregnated with a molten salt electrolyte, and has solid active cathode material dispersed therein. The molten salt electrolyte comprises a substantially equimolar mixture of sodium chloride and aluminium chloride. The active cathode material comprises at least one transition metal selected from the group consisting of Fe, Ni, Cr, Co, Mn, Cu and Mo having, dispersed therein, at least one additive element selected from the group consisting of As, Bi, Sb, Se and Te. The atomic ratio of transition metal:additive element in the active cathode material is 99:1–30:70, the cell having a charged state in which the active cathode material is chlorinated. The invention also provides a method of making such cell.

12 Claims, 9 Drawing Sheets

ELECTROCHEMICAL CELL

This application is a continuing application of U.S. Ser. No. 08/215,844, filed Mar. 22, 1994, now abandoned.

This invention relates to a high temperature rechargeable electrochemical power storage cell; and to a method of making such cell.

According to the invention there is provided a high temperature rechargeable electrochemical power storage cell comprising a cell housing having an interior divided by a separator into an anode compartment and a cathode compartment, the anode compartment containing sodium active anode material, the separator being a solid electrolyte conductor of sodium ions, the cathode compartment containing a sodium aluminium chloride molten salt electrolyte and containing a solid cathode comprising an electrolyte-permeable porous matrix impregnated with the molten salt electrolyte and which has solid active cathode material dispersed therein and is electronically conductive, the cell having an operating temperature at which the sodium and molten salt electrolyte are molten, the electrolyte comprising a substantially equimolar mixture of sodium chloride and aluminium chloride in which the proportion of aluminium chloride in all states of charge is at most 50% on a molar basis, the active cathode material comprising at least one transition metal selected from the group consisting of Fe, Ni, Cr, Co, Mn, Cu and Mo having, dispersed therein, at least one additive selected from the group consisting of As and Sb, the atomic ratio of transition metal:additive element in the active cathode material being 99:1–30:70, and the cell having a charged state in which the active cathode material is chlorinated.

Said atomic ratio may be in the range 90:10–40:60, preferably in the range 80:20–50:50.

It is to be noted that it is desirable to have some solid NaCl in the electrode matrix when the cell is fully charged, so as to guard against acidity in the electrolyte in the event of overcharging.

The active cathode material comprising the transition metal and additive element may, in its fully discharged state, be in the form of, or comprise at least one of, a physical mixture, alloy, solid solution, composition, compound or discrete phase. The active cathode material may thus be a single-phase material, or, if it has more than one phase, each phase may comprise both said transition material and said additive. While the active cathode material may in principle have a transition metal component which comprises more than one said transition metal, and while it may in principle comprise an additive element component which comprises more than one said additive element, it is expected that, usually, it will comprise a single said transition metal and a single said additive element.

The invention thus contemplates, in particular, that the active cathode material may comprise a single transition metal and a single additive element, the transition metal; additive element atomic ratio in the active cathode material being 80:20–50:50.

In the case where the case transition metal component and the additive element component are not chemically bound to each other, the cell will have a nominally fully charged state when all the available transition metal component in the active cathode material has been chlorinated to the dichloride thereof, and/or all the available additive element component in the active cathode material has been chlorinated to the trichloride thereof, and a nominally fully discharged state in which said components are fully dechlorinated. When they are chemically bound to form a compound or discrete phase, the cell will be nominally fully charged when all the available said compound or phase has been fully chlorinated.

Examples of active cathode materials according to the invention are those which comprise Ni and/or Cu as the transition metal, and As or Sb, in particular Sb, as the additive element. Several Ni—Sb compounds exist, namely the phases $Ni_{16}Sb$, $Ni_3Sb$, $Ni_5Sb_2$, $Ni_7Sb_3$, NiSb and $NiSb_2$, and a wide range of solid solutions are possible at cell operating temperatures (typically 200°–400° C.). Any one or more of such phases may be selected to be the active cathode material, and each is expected to display a different electrode potential when fully charged (chlorinated) and coupled with sodium in an electrochemical cell, the higher the proportion of Sb in the phase, the higher the electrode potential expected. Analogous behaviour is expected when the other transition metals (Fe, Cr, Co, Mn, Cu and Mo) from discrete compounds or phases with any one of As or Sb, and indeed when Ni forms discrete compounds or phases with As; or when any two or more of said transition metals, together form discrete compounds or phases with any two or more of said additive elements. Certain compounds or phases are known of combinations of Cu and Sb; of Fe and Sb; of Ni and As; of Fe and As; of Cu and As; of Ni and Bi; etc. Further particular examples of selected phases or compounds are $Cu_2Sb$, CuSb, FeSb, $FeSb_2$, NiAs and the like. Furthermore, suitable alloys or solid solutions, having two or more components, can in principle be employed.

Accordingly, the active cathode material may comprise a transition metal selected from Fe, Ni and Cu, and an additive element selected from As and Sb; and, more particularly, the active cathode material may comprise at least one compound selected from $Ni_{16}Sb$, $Ni_3Sb$, $Ni_5Sb_2$, $Ni_7Sb_3$, NiSb, $NiSb_2$, NiAs, FeSb, $FeSb_2$, $Cu_2Sb$ and CuSb. Particularly preferred are cells in which the active cathode material comprises Ni as its only transition metal and Sb as its only additive element, eg those in which the active cathode material is selected from NiSb and $Ni_2Sb$.

Naturally, the or each transition metal and the or each additive element, and their proportions, should be selected so that as few deleterious effects as possible are introduced into the cell by the presence of the additive element or elements. Thus, the additive element or elements should not unacceptably poison the separator or encourage the transition metal or metals to do so; they should not unacceptably enhance solubility of any transition metal chloride in the molten salt electrolyte; they should not unacceptably increase the polarization of the cell charge/discharge reaction; they should not unacceptably encourage irreversibility of the cell charge/discharge reaction and consequent capacity loss; they should not unacceptably interfere with the function of the molten salt electrolyte; they should not unacceptably interfere with stability of the cell or any of its components at the cell operating temperature; they should not unacceptably corrode any of the metallic cell component such as the cell housing or any current collectors; and they should not unacceptably reduce the specific energy or energy density of the cell. If possible, the composition of the active cathode material should be selected so that, compared with an active cathode material which only comprises the transition metal or metals in question, use of the additive element leads both to an increase in cell voltage and power.

When the transition metal of the cathode is nickel in particular, the cathode compartment may contain a metal halide dopant selected from NaBr, NaI, $SnCl_2$ and mixtures thereof, the cathode compartment in the fully charged state of the cell containing NaCl and the dopant being present in a proportion amounting to 2–20% by mass of the active cathode material in its fully charged chlorinated state. Similar considerations apply to cathodes comprising other active transition metals.

Preferably the proportion of dopant is 1–14% by mass, more preferably 3–7% by mass.

The cathode compartment may contain a current collector, embedded in the matrix of the cathode, which is of a metal which is no less noble than the transition metal of the cathode. The transition metal of the cathode, or a more noble metal, may be used on its own, or the transition metal of the cathode, coated with such more noble metal may be used. When the transition metal of the cathode is nickel, the cathode compartment may thus contain a cathode current collector, embedded in the matrix of the cathode, the current collector having an outer surface which comprises a metal which is more noble than nickel. The metal which is more noble than nickel may be a transition metal, such as molybdenum.

Conveniently, cells in accordance with the invention comprise both said metal halide dopant and said current collector.

Their cathode compartments may contain, in addition, 2–12% by mass, based on the charged active cathode material, of sodium fluoride dopant and/or a sulphur-containing dopant whose sulphur forms 0.3–5% of the charged active cathode material by mass. In other words, the cathode compartment may contain NaF, present in a proportion amounting to 2–12% by mass of the active cathode material in its fully charged active state; and the cathode compartment may contain a sulphur-containing compound having a sulphur content which amounts to 0.3–5% by mass of the active cathode material in its fully charged state.

Particularly preferred values of Ni:Sb ratios are 1:1 and 2:1, in which the active cathode materials, in their fully discharged states, can be regarded, respectively, as the metallic compounds NiSb and Ni$_2$Sb. For these compounds the Applicant believes that it is possible that cell reactions can be expressed respectively by reactions (I) and (II) as follows:

$$xNa + NiSbCl_x \underset{charge}{\overset{discharge}{\rightleftharpoons}} xNaCl + NiSb \qquad (I)$$

wherein x is typically $\leq 5$, cells of this type having a maximum open circuit voltage of about 2.785 V at 300° C.; and $$yNa + Ni_2SbCl_y \underset{charge}{\overset{discharge}{\rightleftharpoons}} yNaCl + Ni_2Sb \qquad (II)$$

wherein y is typically $\leq 7$, cells of this type having a maximum open circuit voltage of about 2.635 V at 300° C.

Instead, it may be more appropriate to express the cell reactions by reactions (III) and (IV) respectively, as follows:

$$3nNa + nNaSbCl_4 + NiSb_{1-n} \underset{charge}{\overset{discharge}{\rightleftharpoons}} 4nNaCl + NiSb \qquad (III)$$

(which can also be expressed as $3nNa + nNaCl +$ $$NiSb_{1-n} + nSbCl_3 \underset{charge}{\overset{discharge}{\rightleftharpoons}} 4nNaCl + NiSb$$

and which applies for $n \geq 0.5$); and $$3mNa + NiSb_m + mNaSbCl_4 \underset{charge}{\overset{discharge}{\rightleftharpoons}} Ni_2Sb + 4mNaCl \qquad (IV)$$

(which can also be expressed as $3mNa + NiSb_m +$ $$mSbCl_3 + mNaCl \underset{charge}{\overset{discharge}{\rightleftharpoons}} Ni_2Sb + 4mNaCl$$

and which applies for $1 > m \geq 0.5$).

In accordance with what is postulated for reaction (III), NaCl reacts during charging with NiSb at the cathode to form Na metal at the anode and SbCl$_3$ at the cathode. This SbCl$_3$ can then immediately combine with NaCl at the cathode to from the product NaSbCl$_4$ which has low solubility, if any, in the molten salt electrolyte.

It is important to note in this case that an additional 0.25 mole of NaCl is required for each mole of NiSb which reacts during charging for reaction (III), for the formation of said NaSbCl$_4$, but, importantly, this extra NaCl is not directly involved in the charging reaction. If this additional NaCl, which reacts with the SbCl$_3$ to form NaSbCl$_4$, is not present, then the SbCl$_3$ can extract NaCl from the NaAlCl$_4$ of the molten salt electrolyte, thereby rendering it acid by increasing the proportion of AlCl$_3$ in the NaAlCl$_4$ electrolyte to above 50 mole %, which is highly undesirable in cells of the type in question, can lead to poisoning of the solid electrolyte and depinning of the active cathode material from the matrix. Tests conducted by the Applicant have indeed demonstrated that when this additional NaCl is absent, test cells exhibit an initial capacity loss accompanied by and followed by a gradual resistance rise with charge/discharge cycling, both of which disappear when the extra NaCl is present.

It is furthermore to be noted that in cells of the type described above, but which omit any said metal halide dopant or excess sodium chloride and which have a nickel current collector embedded in the matrix, a slow and progressive increase in cell resistance is also found to take place, associated with a slow and progressive capacity loss, when continuously cycled, for example by being put through charge/discharge cycles whereby the charging takes place over an 8-hour period at constant current, discharging takes place over a 5-hour period at constant current, and with an upper charging voltage limit or cut-off at 2.90 V. After about 30 cycles capacity decreases of the order of about 40% have been found to occur.

Suprisingly, employment of the above metal halide dopants and/or excess sodium chloride has been found to retard this decay or reduction in capacity, and to retard the associated increase in internal resistance. The Applicant has been unable to establish the reason for the utility of said dopants in this regard, but suspects that it may retard grain- or crystallite growth in the active cathode material in its charged state, which grain growth may reduce cathode capacity and increase internal resistance of the cathode.

Furthermore, use of the cathode current collector described above, has also suprisingly been found to retard capacity loss and to retard increased in internal resistance, once again for reasons which are not understood, but which may have to do with a reduction in degradation of the nickel cathode current collector by the antimony of the active cathode material.

The invention also extends to a method of making a high temperature rechargeable electrochemical power storage cell as described above, which method comprises loading, into an electrochemical cathode compartment separated from an anode compartment in a cell housing by a separator which is a solid electrolyte conductor of sodium ions, at least one additive element selected from the group consisting of As and Sb, admixed with and dispersed in at least one transition metal selected from the group consisting of Fe, Ni, Cr, Co, Mn, and Mo, to provide a transition metal active cathode component and an additive element active cathode component in the cathode compartment which are present in a transitional metal:additive element ratio of 99:1–30:70, said components being loaded into the cathode compartment together with either a sodium aluminium chloride molten salt electrolyte having a proportion of aluminium chloride which is at most 50% thereof on a molar basis, or a precursor of said molten salt electrolyte.

It is to be noted that using a precursor of the molten salt electrolyte, eg as described in U.S. Pat. No. 4,797,333 or British Patent 2,226,692 has the advantage of generating sodium in the anode compartment in the fully discharged state of the cell.

While the additive element and transition metal may be loaded in a chlorinated state respectively as the trichloride and/or the dichloride, dispersed as a mixture in an electronically conductive, porous electrolyte-permeable matrix, together with the electrolyte, the anode compartment being loaded with sodium so that the cell is loaded in its charged state, it is preferred to load the cell in its discharged state or overdischarged state.

Thus, instead, the transition metal component and additive element component may be loaded as a mixture thereof respectively in metallic and elemental form, admixed with a suitable proportion of NaCl and, optionally, $NaAlCl_4$ (when loaded in the discharged state) or Al (when loaded in the overdischarged state). In this case a small starting amount of Na may be loaded into the anode compartment, to place the cell separator in contact with an anode current collector, or an anode current collector may be in direct contact with the separator, no said sodium being loaded. Whether loaded in the discharged or overdischarged state, application of a suitable charging potential will be used in this case to convert what amounts to a discharged, or an overdischarged cell which can be regarded as a cell precursor, into a charged cell according to the invention.

When a cell precursor or overdischarged cell is loaded containing metallic aluminium, it may be preferable to keep such aluminium away from, and physically isolated from, any transition metal active cathode material or any additive element active cathode material loaded into the cell, to avoid the possibility of the formation of any compounds or phases of aluminium with said active cathode materials in their metallic or elemental states, thereby removing them from potential electrochemical activity in the cell. For this reason also, it may be desirable in certain circumstances to load in a fashion which reduces or eliminates the need to load metallic aluminum.

When the transition metal and additive element are added in metallic/elemental form they may be added as a particulate mixture comprising distinct particles thereof, or they may be added bound to each other combined together as a combination thereof, eg an alloy, solid solution, composition or compound thereof, formed eg by heating them together at an elevated temperature under an inert atmosphere to cause them to combine together, in which case they may be cooled and milled into particulate powder form before being loaded into the cathode compartment, with the other cell constituents (molten salt electrolyte or its constituents such as NaCl, $AlCl_3$ and Al, and dopants such as NaF and FeS), which are contained in the cathode compartment, optionally after being formed into granules.

Whether the transition metal component and the additive element component are loaded separately or as an alloy, solid solution, composition, compound or other combination thereof, their respective proportions may be selected in a suitable stoichiometric ratio, corresponding to a particular phase or compound desired as the active cathode material, but in selecting this ratio it should be borne in mind that a proportion thereof may be electrochemically unavailable for the cell charge/discharge reaction and can form, in the charged cell, at least part of the electronically conductive electrolyte-permeable porous matrix in which the chlorinate active cathode material will be dispersed, typically with some NaCl, the matrix being saturated with molten $NaAlCl_4$ electrolyte. The relative proportions of the transition metal component and additive element component will typically be selected to provide a desired electrode potential, bearing in mind the avoidance of deleterious effects mentioned above.

When the active cell material is loaded in the form of a preformed alloy, solid solution, composition, compound or other combination, the cell will typically, after an initial charge cycle, be ready for use. However, when the transition metal component and additive element component are loaded separately and not in any combination other than being part of a particulate mixture, the method of the invention may include taking the cell through a plurality of cell charge/discharge cycles, to activate or condition the active cathode material to cause the transition metal component and additive element component to combine together.

The invention will now be described, by way of example, with reference to the following Example and diagrammatic drawings, in which.

Figure 1:
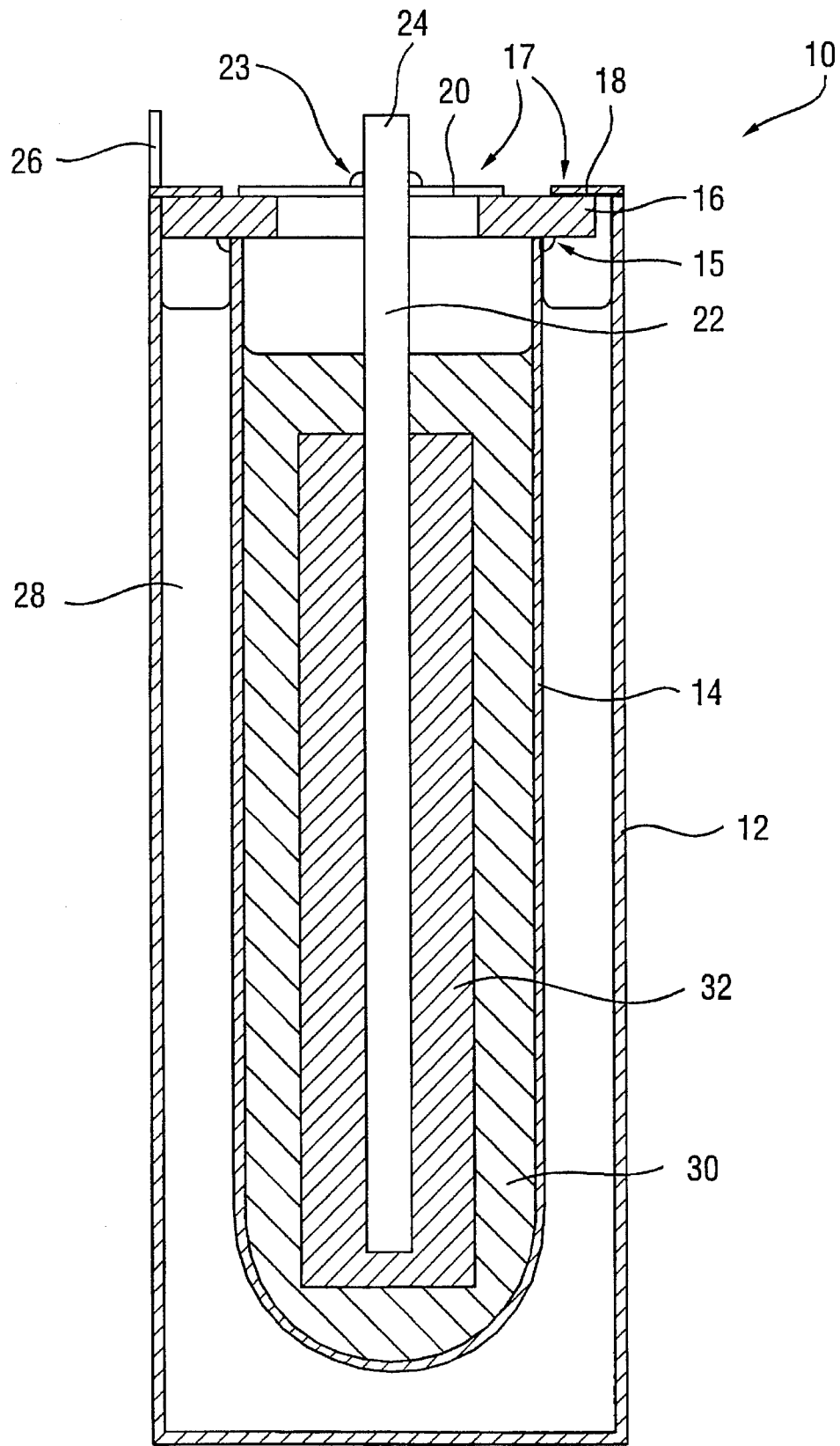
FIG. 1 shows a schematic sectional side elevation of a test cell in accordance with the present invention.

In FIG. 1 a test cell according to the invention is designated 10, and comprises a mild steel cylindrical housing 12, containing, concentrically suspended therein and radially spaced therefrom, a β"-alumina separator tube 14, the interior of the tube 14 being a cathode compartment and the space between the tube 14 and housing being an anode compartment. The tube 14 is shown glass-welded at 15 to an α-alumina insulating collar 16, to which are sealed at 17 an upper rim 18 of the housing 12, and a tube closure panel 20. A nickel rod cathode current collector 22 projects through the panel 20, to which it is sealingly welded at 23, its upper end forming a cathode terminal 24 above the panel 20 and its lower end being close to the lower end of the tube 14, which is closed. An anode terminal 26 projects upwardly from the outer edge of the rim 18. The anode compartment contains molten sodium active anode material 28 and the cathode compartment contains $NaAlCl_4$ molten salt electrolyte 30 comprising an equimolar mix of NaCl and $AlCl_3$; and the cathode compartment also contains a cathode 32 whose structure will be described hereunder with reference to the following Examples.

EXAMPLE 1

A cell was assembled having a molten sodium anode, a β"-alumina separator and, charged into its cathode compartment, a powder mixture having the following composition on a mass basis:

| Constituent | Composition % by mass |
|---|---|
| Nickel (Ni) | 22.5 |
| Antimony (Sb) | 46.6 |
| Sodium Chloride (NaCl) | 28.4 |
| Sodium Fluoride (NaF) | 1.6 |
| Aluminium (Al) | 0.9 |

The sodium chloride, sodium fluoride and aluminium all had a particle size of <53 μm, the nickel having a particle size of 5 μm and the antimony having a particle side of 44 μm. The powders were thoroughly mixed together to form a homogeneous mixture and the mixture was pressed in a stainless steel die to form a compressed compact having a theoretical capacity, against sodium, of 0.4 $Ah/cm^3$. The compact was granulated to a granule size of 250–1000 μ and the granules were loaded into the cathode compartment of the cell, with a nickel felt cathode current collector embedded therein, in contact with the nickel rod 22 (FIG. 1). The powder mixture acted as a cathode precursor which, upon heating to the operating temperature (300° C.) of the cell, and upon being taken through a charging cycle, formed a porous, electrolyte-permeable NiSb matrix saturated with $NaAlCl_4$ molten salt electrolyte comprising an equimolar mixture of NaCl and $AlCl_3$ having, dispersed therein, charged active cathode material comprising chlorinated NiSb of formula $NiSb_x$ or $NiSb_{1-}$ (see reactions (I) or (III) above). The mole ratio of Ni:Sb was found to be between 49.5:50.5 and 50.2:49.8, i.e. about 1:1.

The cell so constructed was put through a number of charge/discharge cycles at 300° C. at approximately the 8-hour charge rate and 6-hour discharge rate, using the constant current charging mode and 2.90 V voltage cut-off limit. The cell had a theoretical capacity of 15 Ah, a constant charging current of 1.5 A and a constant discharging current of 2.5 A. A plot of its third discharge cycle is shown at 1 in FIGS. 2 and 9 and a plot of its 30th discharge cycle is shown at 2 in FIG. 3.

EXAMPLE 2

Example 1 was repeated, except that the cathode powder mixture was doped with sodium bromide (NaBr) powder having a particle size of 53 μm, so that it had the following composition by mass:

| Constituent | Composition % by mass |
|---|---|
| Ni | 21.0 |
| Sb | 43.9 |
| NaCl | 25.4 |
| NaF | 1.6 |
| Al | 0.9 |
| NaBr | 7.2 |

Figure 2:
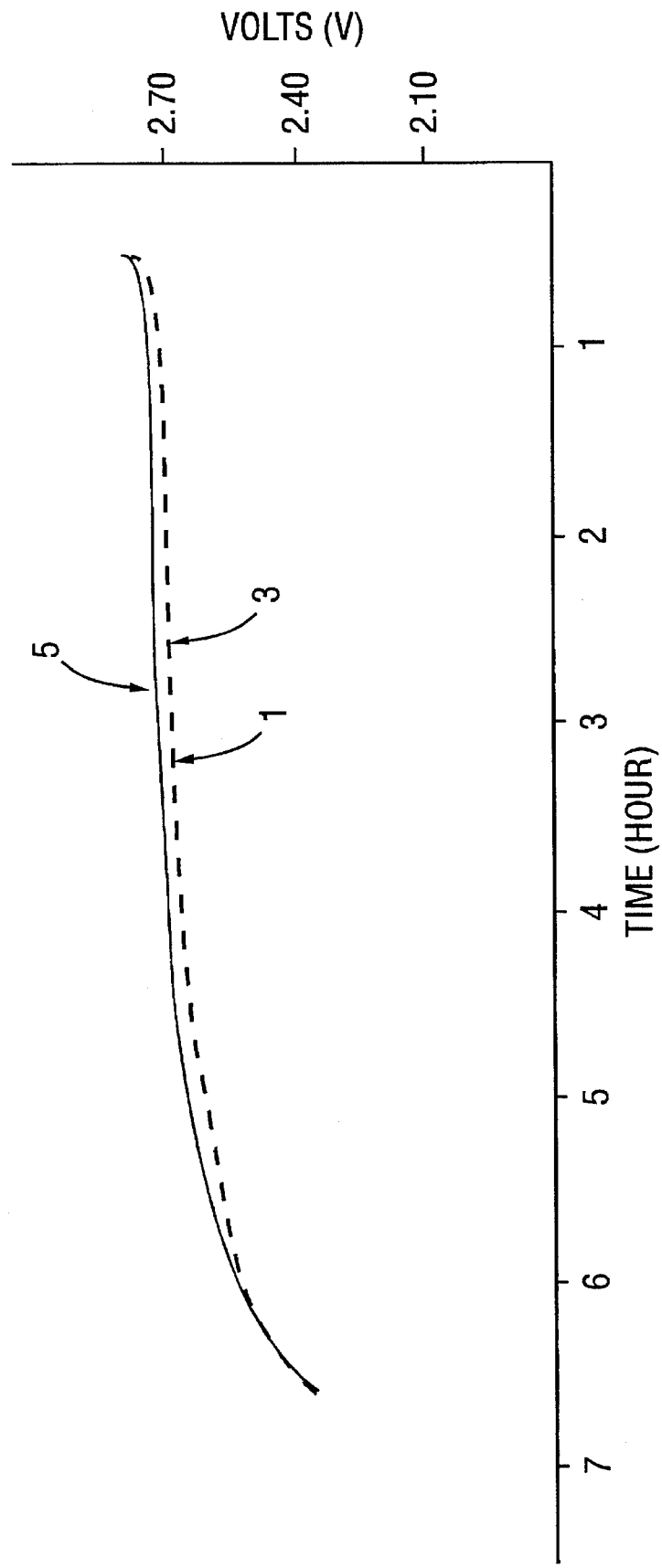
FIG. 2 is a plot of time against voltage of the discharge curves of cells according to the invention and a comparative cell, also in accordance with the invention, for the third discharge cycle of each cell.
Figure 3:
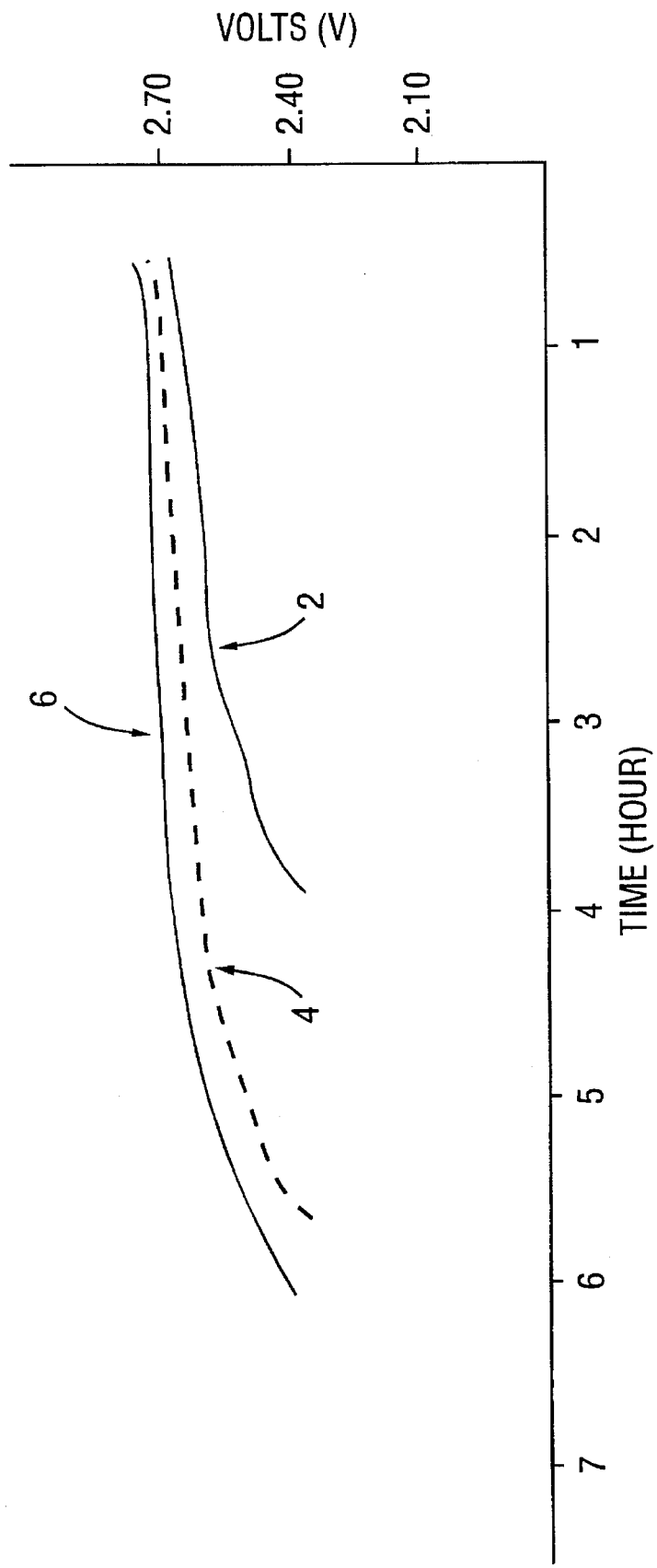
FIG. 3 is a plot, similar to FIG. 2, for the same cells, of the 30th discharge cycle of each cell.
Figure 4:
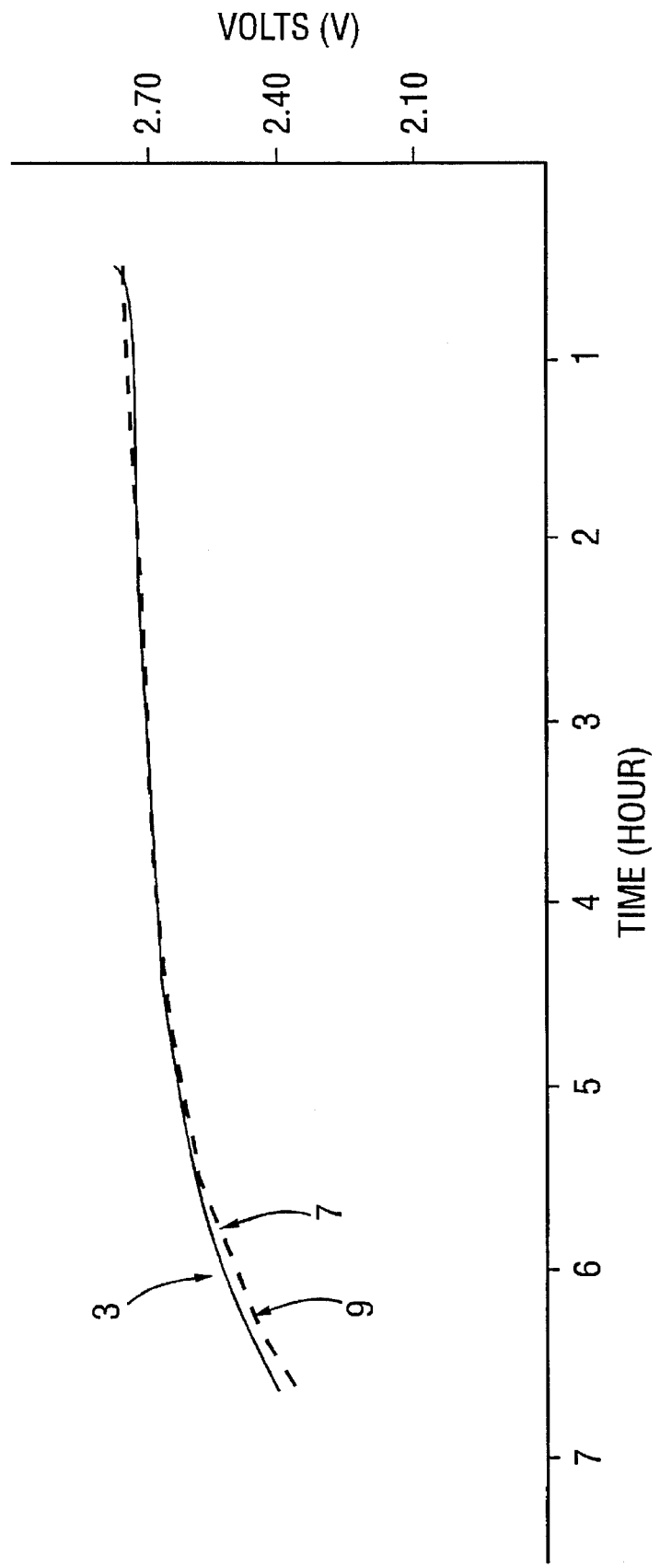
FIG. 4 is a plot, similar to FIG. 2, for further cells according to the invention of the third discharge cycles thereof.
Figure 5:
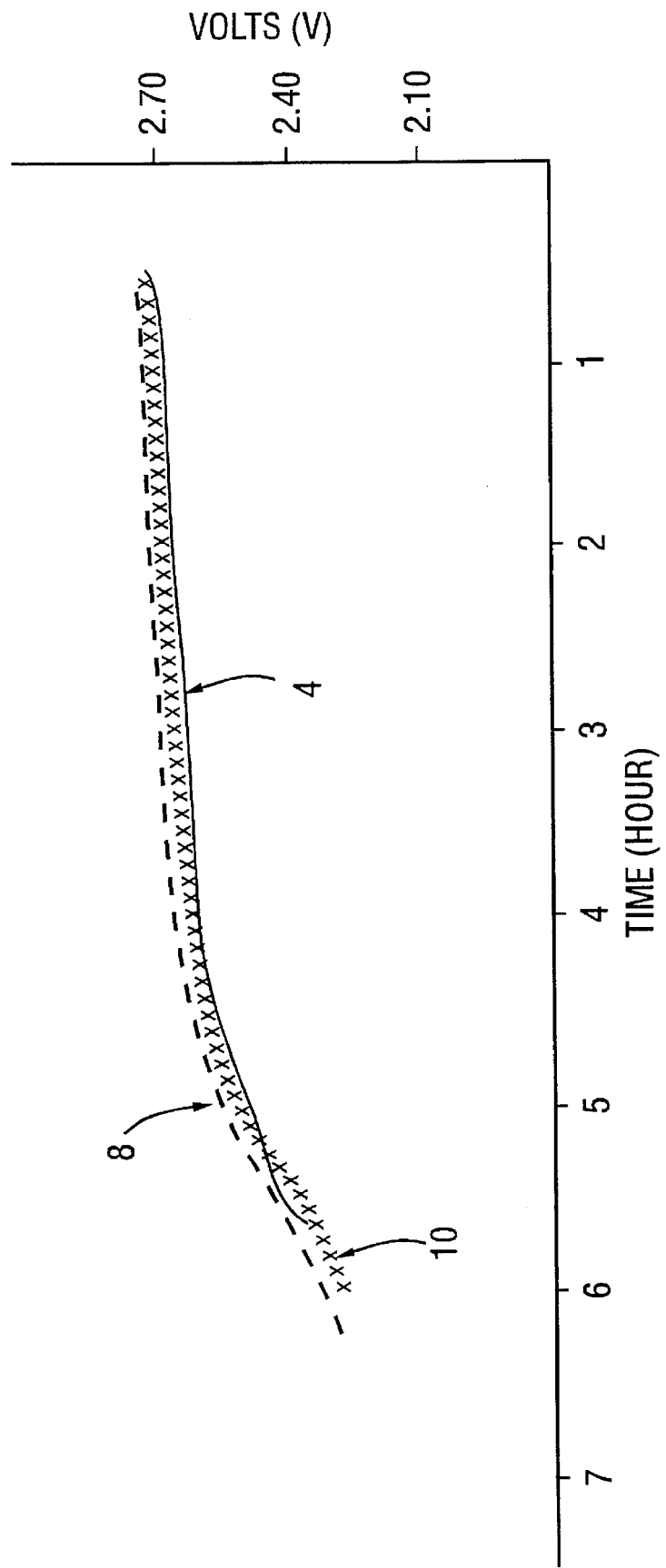
FIG. 5 is a plot, similar to FIG. 3, for the cells of FIG. 4, of the 30th discharge cycles thereof.
Figure 6:
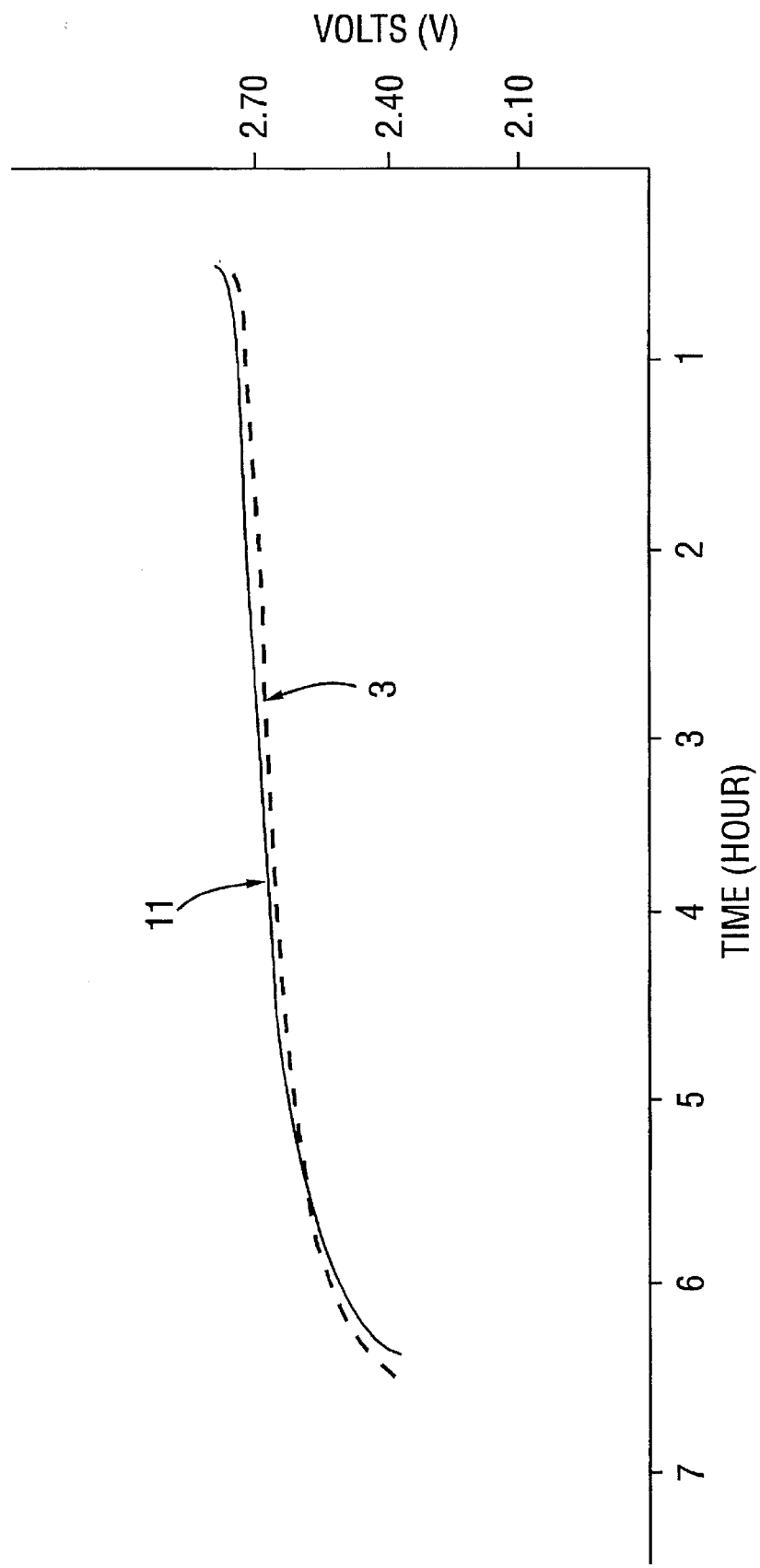
FIG. 6 is a plot, similar to FIG. 2, for a still further cell according to the invention and a comparative cell according to the invention, of the third discharge cycle of each cell.
Figure 7:
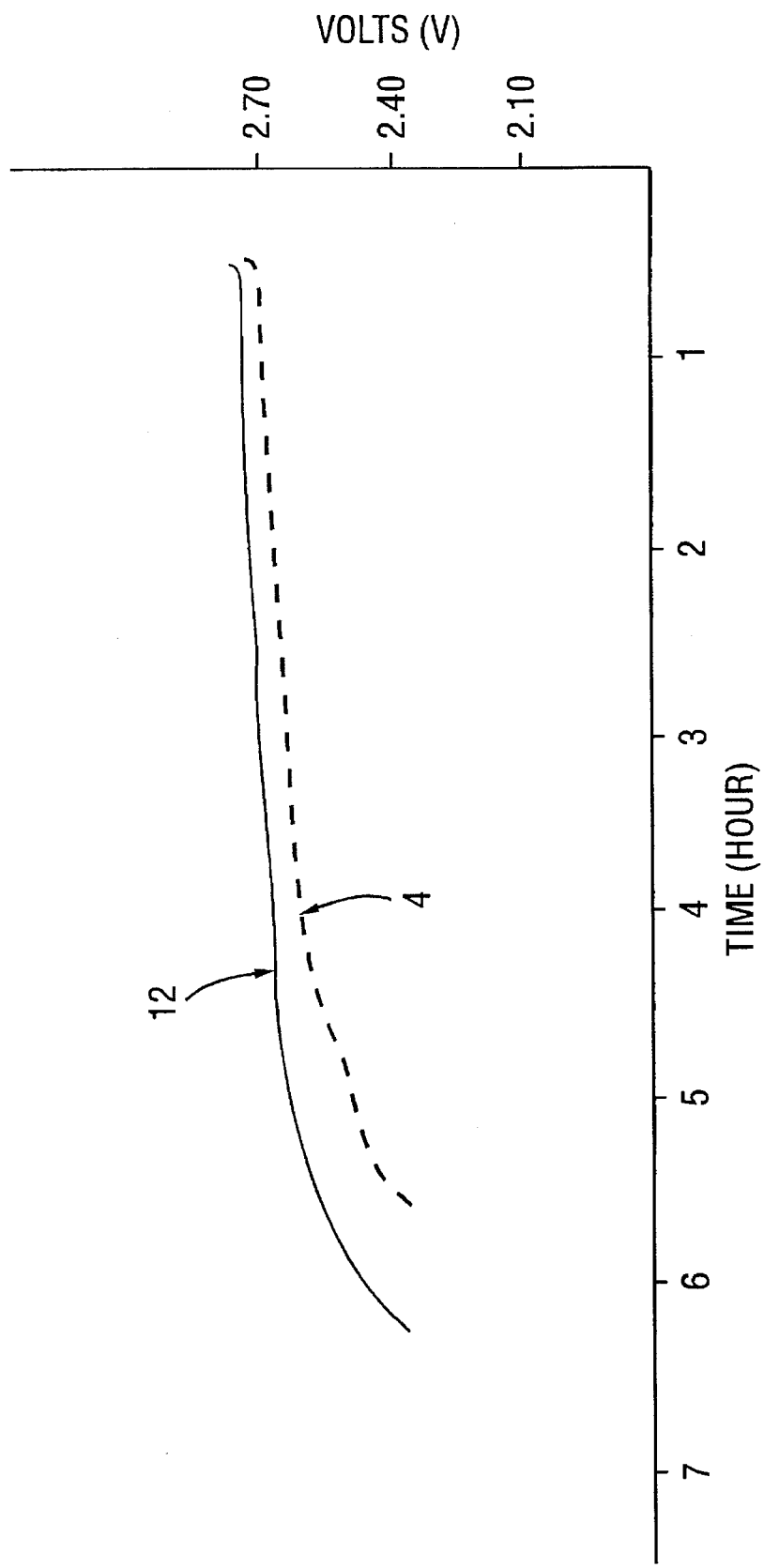
FIG. 7 is a plot, similar to FIG. 3, for the cells of FIG. 6, of the 30th discharge cycles thereof.

The third and 30th discharge curves in this cell are shown respectively at 3 and 4 in FIGS. 2 and 3, respectively at 3 and 4 in FIGS. 4 and 5, and respectively at 3 and 4 in FIGS. 6 and 7.

EXAMPLE 3

Example 1 was repeated, except that the cathode powder mixture was doped both with said NaBr and with tin chloride ($SnCl_2$) also having a particle size of <53 μm, so that it had the following composition by mass:

| Constituent | Composition % by mass |
|---|---|
| Ni | 20.0 |
| Sb | 41.4 |
| NaCl | 26.7 |
| NaF | 1.4 |
| Al | 0.9 |
| NaBr | 4.5 |
| $SnCl_2$ | 5.1 |

The third and 30th discharge curves of this cell as shown respectively at 5 and 6 in FIGS. 2 and 3.

EXAMPLE 4

Example 1 was repeated, except that the cathode powder mixture was doped both with said NaBr and with sulphur (S) having a particle size of 53 μm, so that it had the following composition by mass:

| Constituent | Composition % by mass |
|---|---|
| Ni | 20.1 |
| Sb | 42.3 |
| NaCl | 26.9 |
| NaF | 1.6 |
| Al | 0.9 |
| NaBr | 6.9 |
| S | 1.3 |

The third and 30th discharge curves of this cell are shown respectively at 7 and 8 in FIGS. 4 and 5.

EXAMPLE 5

Example 1 was repeated, except that the cathode powder was doped with NaBr and ferrous sulphide (FeS) having a particle size of 53 μm, so that it had the following composition by mass:

| Composition | |
|---|---|
| Constituent | % by mass |
| Ni | 19.2 |
| Sb | 40.5 |
| NACl | 28.8 |
| NaF | 1.7 |
| Al | 0.9 |
| NaBr | 6.8 |
| FeS | 2.1 |

The third and 30th discharge curves of this cell are shown respectively at 9 and 10 in FIGS. 4 and 5.

EXAMPLE 6

Example 1 was repeated except that its nickel felt current collector was replaced by a molybdenum felt current collector of the same construction. The third and 30th discharge curves of this cell are shown respectively at 11 and 12 in FIGS. 6 and 7.

EXAMPLE 7

Example 1 was repeated except that there was a minor alteration in the proportions of Ni and Sb, and an excess of NaCl was added in accordance with reaction (III) while no metallic aluminium was loaded initially into the cathode compartment. This cell was operated in the fashion of the cell of Example 1. The powder mixture used had the following composition on a mass basis:

| Composition | |
|---|---|
| Constituent | % by mass |
| Ni | 18.2 |
| Sb | 39.3 |
| NaCl | 40.9 |
| NaF | 1.6 |

Figure 8:
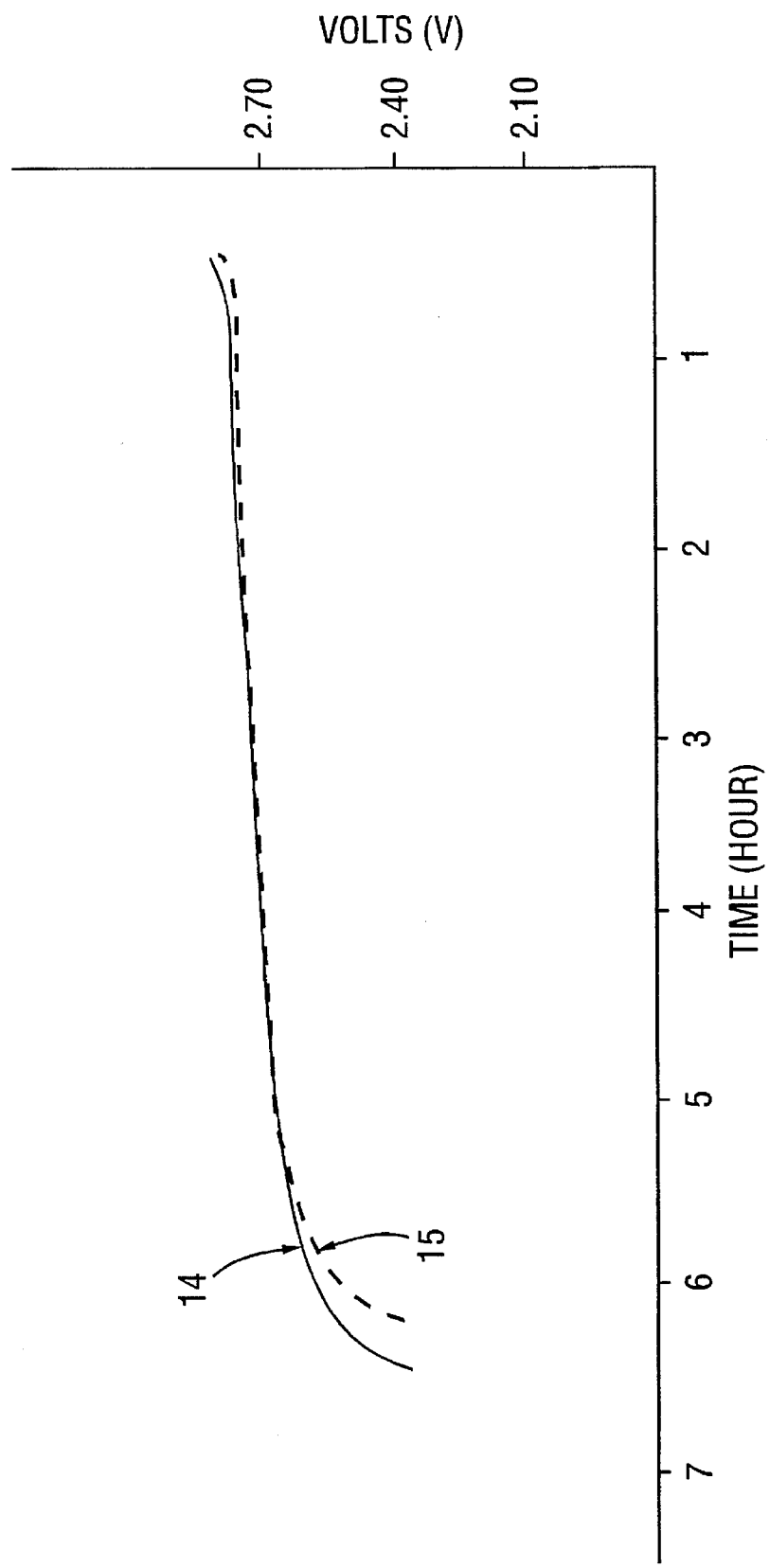
FIG. 8 is a plot, similar to FIG. 2, of the third and 30th discharge cycles of a still further cell according to the invention.

The third and 30th discharge curves of this cell as shown respectively at 14 and 15 in FIG. 8.

EXAMPLE 8

Example 1 was repeated, except for an alteration in the proportions of nickel and antimony in the powder mixture, so that it had the following composition by mass:

| Composition | |
|---|---|
| Constituent | % by mass |
| Ni | 31.8 |
| Sb | 33.2 |
| NaCl | 32.5 |
| NaF | 1.6 |
| Al | 0.9 |

Figure 9:
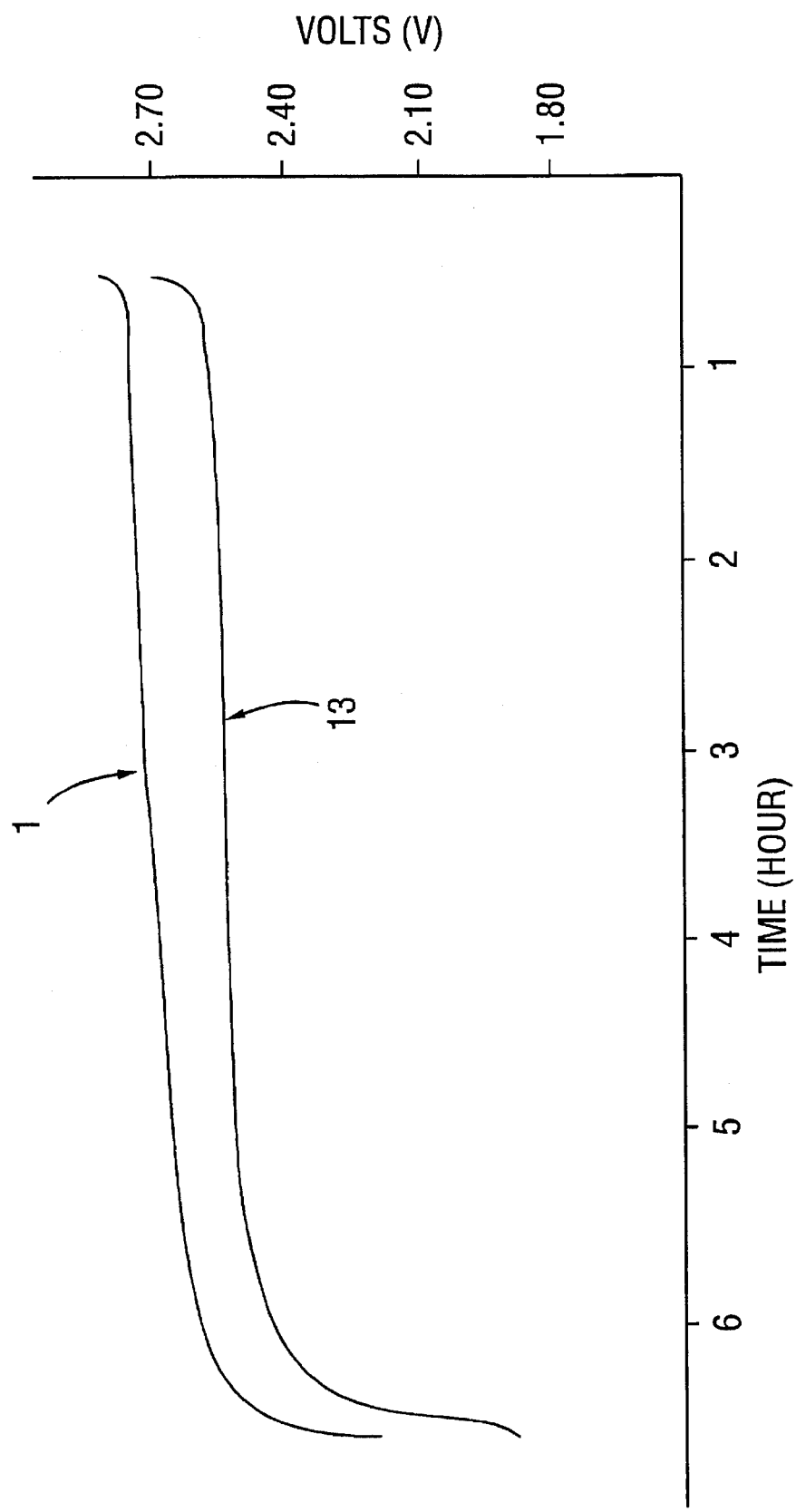
FIG. 9 is a plot, similar to FIG. 1, for two comparative cells, in accordance with the invention, of the third discharge cycle thereof.

The third discharge curve of this cell is plotted at 13 in FIG. 9, and it is to be noted that the mole ratio of Ni:Sb in the cathode of this cell is about 2:1

From FIGS. 2 and 3 it can be seen that, while after three cycles there is little difference between the capacities and internal resistances of the cells according to the invention of Examples 2 and 3, compared with the control cell of Example 1, there is an appreciable difference after 30 cycles, between the cell of Example 1, on the one hand, and the cells of Examples 2 and 3, on the other hand, the cells according to the invention of Examples 2 and 3 having higher capacities and lower internal resistances than the control cell of Example 1, with the cell of Example 3 having a somewhat better performance than that of Example 2 in this regard.

From FIGS. 4 and 5 it can be seen that, while there is little to choose, after three cycles, between the cells of Examples 2, 4 and 5, after 30 cycles the cell of Example 4 shows the best performance with regard to capacity and internal resistance and the cell of Example 2 the worst, with the cell of Example 5 giving intermediate results.

Turning to FIGS. 6 and 7 it is clear that, while the cells of Examples 2 and 6 show substantially the same performance regarding capacity and internal resistance after three cycles, that of Example 6 shows a plainly better performance after 30 cycles.

Turning finally to FIG. 9, this shows that, after three cycles, the capacities of the control cells of Examples 1 and 8 are substantially similar, but the voltage of that of Example 1 is substantially higher than that of Example 8, confirming that the compound NiSb of Example 1, having a higher proportion of Sb (1:1 mole ratio of Ni:Sb) than the compound $Ni_2Sb$ of Example 8 (2:1 mole ratio of Ni:Sb), exhibits a higher voltage against sodium.

The open circuit voltages at 300° C. for the 1:1 and 2:1 mole ratios were measured at 2.78 and 2.63 V respectively.

It may be an advantage of the invention that the use of NaBr (or other suitable alkali metal halide analogue thereof such as NaI) and $SnCl_2$ dopants of the type in question or an excess NaCl according to reactions (III) or (IV), and at least the use of a molybdenum cathode current collector, can resist progressive capacity loss and internal resistance rise in cells of the type in question, and it appears possible that doping such cells also with FeS and particularly sulphur, can cause still further improvement in this regard.

Finally, it should be noted that a test cell was constructed in a similar manner to those described in Example 1, using Cu and Sb instead of Ni and Sb as active cathode materials in a 1:1 atomic ratio. Its discharge behaviour appeared to be similar to that described for the test cells in the Examples, except that the open circuit voltage stabilized at a value of 2.82 V instead of the 2.78 V for Examples 1–6 or the 2.63 V of Example 8.

We claim:

1. A high temperature rechargeable electrochemical power storage cell comprising a cell housing having an interior divided by a separator into an anode compartment and a cathode compartment, the anode compartment containing sodium as active anode material, the separator being a solid electrolyte conductor of sodium ions, the cathode compartment containing a sodium aluminium chloride molten salt electrolyte and containing a solid cathode comprising an electrolyte-permeable porous matrix impregnated with the molten salt electrolyte and which has solid active cathode material dispersed therein and is electronically conductive, the cell having an operating temperature at which the sodium and molten salt electrolyte are molten, the molten salt electrolyte comprising a substantially equimolar mixture of sodium chloride and aluminium chloride in which the proportion of aluminium chloride in all states of charge is at most 50% on a molar basis, the active cathode material comprising at least one transition metal selected from the group consisting of Fe, Ni, Cr, Co, Mn, Cu and Mo having, dispersed therein, at least one additive element selected from the group consisting of As and Sb, the atomic ratio of transition metal additive element in the active cathode material being 99:1–30:70, and the cell having a charged state in which the active cathode material is chlorinated.

2. A cell as claimed in claim 1, in which the active cathode material comprises a single transition metal and a single additive element, the transition metal additive element atomic ratio in the active cathode material being 80:20–50:50.

3. A cell as claimed in claim 1, in which the active cathode material comprises a transition metal selected from Fe, Ni and Cu, and an additive element selected from As and Sb.

4. A cell as claimed in claim 3, in which the active cathode material comprises at least one compound selected from $Ni_{16}Sb$, $Ni_3Sb$, $Ni_5Sb_2$, $Ni_7Sb_3$, NiSb, $NiSb_2$, NiAs, FeSb, $FeSb_2$, $Cu_2Sb$ and CuSb.

5. A cell as claimed in claim 3, in which the active cathode material comprises Ni as its only transition metal and Sb as its only additive element.

6. A cell as claimed in claim 4, in which the active cathode material is selected from NiSb and $Ni_2Sb$.

7. A cell as claimed in claim 5, in which the cathode compartment contains a dopant selected from NaBr, NaI, $SnCl_2$ and mixtures thereof, the cathode compartment in the fully charged state of the cell containing solid NaCl, and the dopant being present in a proportion amounting to 2–20% by mass of the active cathode material in its fully charged chlorinated state.

8. A cell as claimed in claim 5, in which the cathode compartment contains a cathode current collector, embedded in the matrix of the cathode, the current collector having an outer surface which comprises a metal which is more noble than nickel.

9. A cell as claimed in claim 8, in which the metal which is more noble than nickel is molybdenum.

10. A cell as claimed in claim 1, in which the cathode compartment contains NaF, present in a proportion amounting to 2–12% by mass of the active cathode material in its fully charged active state.

11. A cell as claimed in claim 1, in which the cathode compartment contains a sulphur-containing compound having a sulphur content which amounts to 0.3–5% by mass of the active cathode material in its fully charged state.

12. A method of making a high temperature rechargeable electrochemical power storage cell as claimed in claim 1, which method comprises loading, into an electrochemical cell cathode compartment separated from an anode compartment in a cell housing by a separator which is a solid electrolyte conductor of sodium ions, at least one additive element selected from the group consisting of As and Sb, admixed with and dispersed in at least one transition metal selected from the group consisting of Fe, Ni, Cr, Co, Mn, Cu and Mo, to provide a transition metal active cathode component and an additive element active cathode component in the cathode compartment which are present in a transition metal:additive element atomic ratio of 99:1–30:70, said components being loaded into the cathode compartment together with either a sodium aluminium chloride molten salt electrolyte having a proportion of aluminium chloride which is at most 50% thereof on a molar basis, or a precursor of said molten salt electrolyte.

* * * * *

UNITED STATES PATENT AND TRADEMARK OFFICE
CERTIFICATE OF CORRECTION

PATENT NO. : 5,476,733

DATED : December 19, 1995

INVENTOR(S) : Johan Coetzer, et. al.

It is certified that error appears in the above-indentified patent and that said Letters Patent is hereby corrected as shown below:

In claim 1, column 11, line 5, delete the phrase "metal additive" and insert --metal:additive-- therefor.

In claim 2, column 11, line 11, delete the phrase "metal additive" and insert --metal:additive-- therefor.

Signed and Sealed this

Seventh Day of May, 1996

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO.    :    5,476,733
DATED         :    December 19, 1995
INVENTOR(S)   :    Johan Coetzer et al.

It is certified that error appears in the above-identified patent and that said Letters Patent is hereby corrected as shown below:

In Claim 6, column 11, line 24, delete "claim 4," and insert --claim 3,-- therefor.

Signed and Sealed this

Twenty-fifth Day of February, 1997

Attest:

Attesting Officer

BRUCE LEHMAN

*Commissioner of Patents and Trademarks*